May 6, 1958 — K. K. KENNEPOHL — 2,833,272
HAND WEED BURNER
Filed Jan. 7, 1957
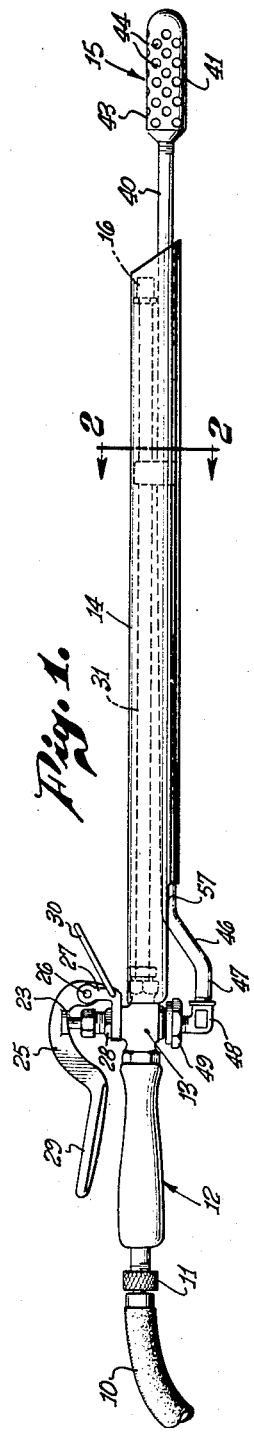
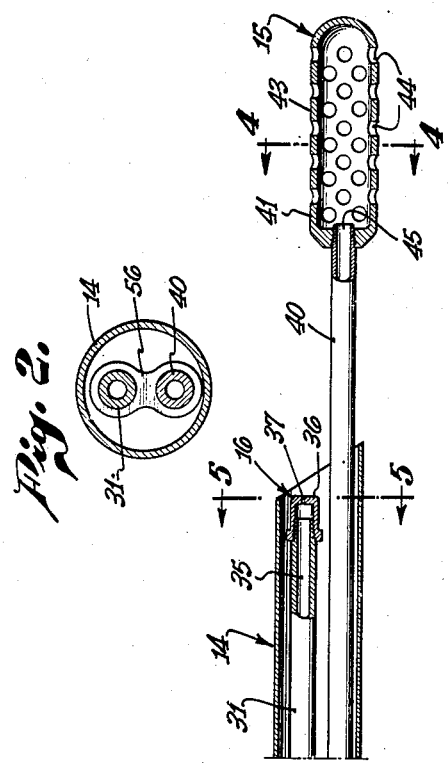
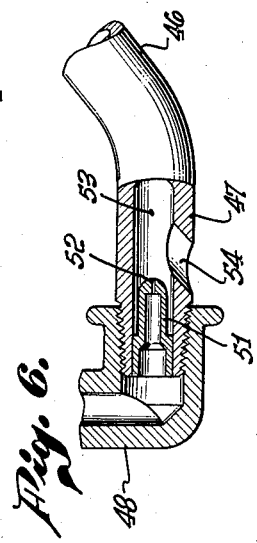
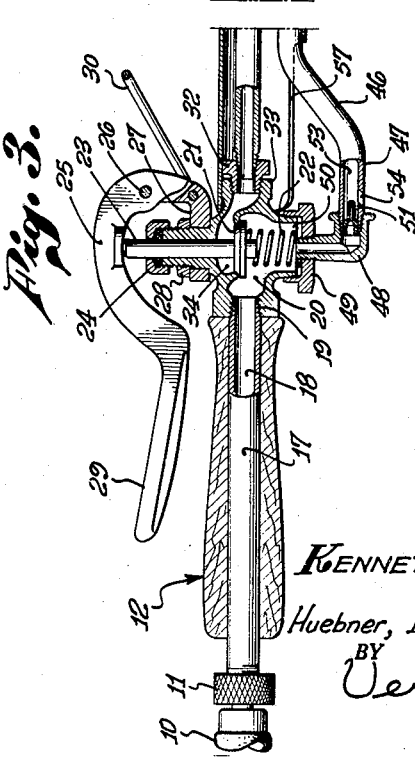
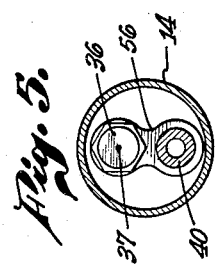
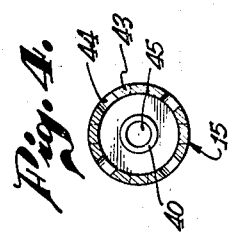
Kenneth K. Kennepohl
INVENTOR.
Huebner, Beehler, Worrel & Herzig
BY
ATTORNEYS.

United States Patent Office 2,833,272
Patented May 6, 1958

2,833,272

HAND WEED BURNER

Kenneth K. Kennepohl, Lancaster, Calif.

Application January 7, 1957, Serial No. 632,887

4 Claims. (Cl. 126—271.2)

The invention relates to torches which consume gas under pressure for the purpose of emitting a flame in a specified direction and has particular reference to a small portable torch capable of being easily carried around by hand and manipulated in such fashion that patches of weeds or weeds growing over considerable areas may be burned off close to the ground.

In the agricultural field various techniques have been developed throughout the years for ridding arable land of unwanted weed growths. Some of these methods have consisted of some form of cultivating whereby weeds are cut off under or near the roots or by use of chemical weed killers and in other instances irrigated to cause them to sprout, after which they are cut off before the seeds form from which new growth is produced. The treatment of arable land to remove weeds varies to a considerable degree with the type of weeds encountered and also with the particular soil or climate where the cultivation is taking place.

Some recent experiments have indicated that weeds can be destroyed and at the same time the land kept suitable for cultivation by the burning of weeds under controlled conditions. Since the mere destruction of weeds must be accompanied by the preservation of the land for future cultivation, equipment used to produce the flame and to direct it needs to be of such character that the flame can be kept well under control.

This is a continuation-in-part of my co-pending application Serial No. 462,998, filed October 18, 1954, now abandoned.

It is therefore among the objects of the invention to provide a new and improved hand portable weed burning mechanism and system capable of careful control with respect to direction and frequency of operation.

Another object of the invention is to provide a new and improved weed burning torch capable of utilizing gas in the nature of liquid petroleum under appreciable pressure and which is provided with a pilot flame so constructed and located that it operates to ignite the fuel under the most favorable circumstances.

Another object of the invention is to provide a new and improved light-weight hand operated gas torch with the handle for the torch and the handle for turning on the fuel supply so located with respect to each other that the apparatus can be operated with one hand, the arrangement of a high pressure fuel jet and pilot therefor being such that the direction and ignition of the fuel can be carefully controlled.

Another object of the invention is to provide a new and improved compact hand operated torch wherein an initial mixing of air for a properly located pilot cage or housing aids to a great degree in maintaining a proper flame, there being further provided a control for auxiliary air so located with respect to both the fuel jet and the pilot housing as to aid materially in proper control of the flame.

Also among the objects of the invention is to provide a new and improved light-weight portable torch mechanism capable of handling gas under considerable pressure which is particularly simple in its construction and operation and moreover constructed with a view to economy in the number of parts and assembly operations so that the device can be marketed at a substantially minimum cost.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of the torch.

Figure 2 is a cross-sectional view taken on the line 2—2 of Figure 1.

Figure 3 is a longitudinal sectional view of the torch foreshortened for purposes of illustration.

Figure 4 is a cross-sectional view on the line 4—4 of Figure 3.

Figure 5 is a cross-sectional view on the line 5—5 of Figure 3.

Figure 6 is a fragmentary longitudinal sectional view of the pilot jet drawn to a slightly larger scale.

In an embodiment chosen for the purpose of illustration there is shown a flexible fuel gas line 10 adapted to be connected to some suitable source of fuel gas under pressure (not shown), the gas line being equipped with a fitting 11 connected to a handle 12 of the torch or burner. The burner consists essentially of a valve mechanism 13, a pilot flame housing 15, and a fuel jet 16. A barrel 14 may be provided as shown.

The torch or burner is designed so that it is especially adapted for use with liquid petroleum gas such as propane or one of the other current commercial hydrocarbons which are marketed as liquids in pressure sealed containers for use in gaseous form as they are withdraw from the containers operative at pressures from ten pounds per square inch to two hundred or more pounds per square inch. By utilization of a conventional valve on the container the pressure of gas emerging therefrom can be controlled within certain limits of efficient and economic operation considering the type of fuel being employed. The usual portable containers, not shown, may be taken into the field and moved about as the needs of the torch require.

For successful operation of a weed torch or burner an item of importance is that of enabling an operator to carry the torch handily about, to direct it accurately, and to release the flame at precisely the desired interval, and moreover to continue operation in this fastion for relatively long periods of time without undue fatigue. It becomes important to accomplish this that the flame emitted from the torch be capable of traveling some distance from the operator and to burn a sufficient area at that distance. It should also be one capable of being turned on at a given instant and shut off as quickly as the work is done both from the point of view of proper application of the flame and also economy in the use of gas. It is especially advantageous to have the torch capable of being manipulated entirely by one hand.

As shown more particularly in the form selected for illustration the handle 12 has a pipe 17 extending through it providing a gas passage 18. The pipe is connected by means of the fitting 11 previously referred to at the discharge end of the fuel gas line 10. The valve mechanism 13 has an intake connection to the pipe 17 whereby gaseous fuel is conducted into a chamber 20.

For controlling the flow of gas under pressure to the fuel jet 16 there is provided in the valve mechanism a valve element 21 urged by means of a spring 22 upon an appropriate valve seat. A valve stem 23 extends through a packing gland 24 to a location where its outer end is adapted to be depressed by manipulation of a handle 25. The handle is pivoted upon a pin 26 which in turn is mounted upon a bracket 27, the bracket being held in place by a nut 28. A handhold 29 of the handle normally lies adjacent the handle 12 of the torch in a position more or less parallel to the handle of the torch and no further away than would permit an operator to grasp both the torch handle and the handhold in one hand. A bail 30 attached to the bracket 27 can be swung to position over the handle in order to lock the handle in a down position in which the valve element is unseated and the valve is opened.

A fuel supply extension pipe 31 is shown attached by means of a bushing 32 to a discharge end 33 of the valve, thereby to provide passage from a discharge chamber 34 of the valve through a fuel line passage 35 in the pipe. A fuel jet fitting 36 has a fuel jet orifice 37 therein, the fitting being threadedly secured to the discharge end of the extension pipe 31.

A pilot supply pipe 40 lies parallel to the extension pipe 31 and is spaced only a short distance therefrom. The pilot supply pipe has a pilot flame housing 41 at its discharge end where it is threadedly secured. The housing may have a closed outer end and has a wall 43 pierced with a multiplicity of perforations 44. A pilot mixture outlet 45 discharges fuel in an axial direction within the flame housing and which is adapted to burn within the housing.

To supply the housing with a mixture of pilot gas and air the pilot supply pipe 40 is connected through a diagonal portion 46 and a short straight section 47 to a street L48. The street L threadedly engages a cap 49 which closes an opening 50 into the chamber 20.

In the end of the street L48 adjacent the connection with the short straight portion 47 of the pilot supply pipe there is mounted a pilot jet bushing 51. The pilot jet bushing is provided with a pilot jet orifice 52 whereby the liquid gas passes from the pilot jet orifice 52 into a pilot mixture passage 53. The straight portion 47 is provided with a pilot air intake opening 54 immediately adjacent the pilot jet orifice and directed in an angular direction toward the flow of fuel and air within the pilot mixture passage 53. The pilot jet bushing may be secured in the end of the straight section 47 by some conventional means well known to mechanics skilled in the art. The supplying of a gas-air mixture to the pilot outlet is productive of a hot blue flame in the pilot flame housing 41 strong enough and under sufficient pressure to maintain itself burning under out of door conditions where there are frequent interruptions in the flow of fuel from the jet orifice 37.

To further improve the flow of air as an auxiliary entrained gas the barrel 14 previously referred to is fitted around both the extension pipe 31 and the pilot supply pipe 40. The barrel extends over the entire length of the extension pipe and over the mid-portion of the pilot supply pipe 40. The pipes may be suitably positioned one with respect to the other by means of a casting 56 having apertures therethrough adapted to receive the respective pipes before the fuel jet fitting 36 is applied to the fuel extension pipe and the flame housing 43 is applied to the pilot supply pipe 40.

The barrel 14 when used is provided with an opening 57 which, besides incidentally fitting over the diagonal portion 46 of the pilot supply pipe, also provides an ample air intake to improve the flow of air over the pipes and around the fuel jet orifice 37 as fuel gas under pressure from the orifice tends to draw air through the barrel. Air emerging from the barrel in a position surrounding the fuel jet orifice 37 tends to improve the direction of flow of fuel gas so that it is confined temporarily to the area around the flame housing 43. Fuel gas thus confined is adapted to have portions of it enter the perforations 44 to the interior of the flame housing there to be ignited by the pilot flame after which the entire body of fuel gas surrounded respectively by air from the valve 14 and the surrounding air is effectively kindled. The fuel gas is ejected from the fuel jet orifice with sufficient force that after being ignited within the flame housing the flaming jet of burning fuel gas continues for a distance of three or four feet beyond the flame housing to the location of the area to be burned. Slight pressure upon the handle 29 unseating the valve element 21 is sufficient to immediately turn on the flame and release of the handle enables the operator to shut it off.

Since in the burning of masses of weeds a large volume of flame needs to be driven with ample force into and between the weeds, the relationship of operating parts of the burner must be such as will project a hot flame a considerable distance from the burner whenever desired. This is accomplished by locating the pilot flame about five or more inches beyond the fuel jet orifice 37 and having both the fuel jet orifice and pilot mixture outlet point generally in the same direction and close to a common longitudinal axis.

By forcing fuel from the fuel jet orifice through the surrounding atmosphere at the high pressures made reference to, namely, ten pounds per square inch to two hundred pounds per square inch and upwards, the fuel as it emerges from the fuel jet orifice picks up air and effects an agitation of fuel and the air thus picked up on its way to and past the pilot flame housing. The mixture surrounds the housing during its passage and is ignited at the housing. The burning fuel air mix carries well beyond the housing often several times the length of the torch and has sufficient force to have a substantial volume of flame reach the bases of masses of weeds there to singe both weeds and roots. Arranged as shown and described the burner may be turned on and off innumerable times under a fuel flow wherein the pressure may vary considerably and under gusty conditions as well without prospect of having the pilot flame extinguished.

From the structure herein described it will be clear that the flow of pilot mixture is continuous so that the pilot can burn all of the time. The flame starts only when the valve element 21 is depressed permitting fluid fuel under considerable pressure to be blown out of the jet orifice 37 into a position generally surrounding the flame housing where it is ignited. The force is sufficient to carry the ignited flame in the form of a torch three or four feet to its destination where weeds or other things are to be burned.

In the construction of the device substantially conventional sections of commercial raw materials are employed such as pipes, fittings and valves. They are formed in such fashion that they can be easily threaded into place and there secured as by the casting 56 with the assistance of the barrel 14. Assembly operations are thereby held to a minimum as well as is the cost maintained at a low figure due to the fact that relatively few separate parts are employed. Jet openings are in reasonably substantial alignment so that the entire assembly acts as a wand or torch easily directed as well as easily manipulated so as to turn the flame on and off.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A hand-operated torch comprising a torch handle having a fuel gas passage therethrough, a valve on the handle connected to a discharge end of the passage and a fuel supply extension pipe on said valve substantially in alignment with the passage and having a fuel jet at a discharge end thereof, a pilot supply pipe located parallel to and adjacent the fuel extension pipe, said pilot supply pipe having a pilot flame housing at a discharge end thereof spaced outwardly relative to the fuel jet, said housing being of diameter larger than the pipe and having a plurality of laterally directed openings and a closed outer end, said pilot supply pipe having an offset portion at the supply end, a pilot jet in said supply end and a connection between said pilot jet and the valve at the supply side of the valve, said pilot supply pipe having an air intake adjacent the pilot jet, an elongated barrel secured at an inlet end to the valve and surrounding said extension and a mid-portion of said pipe, said barrel having an air inlet opening adjacent the valve and an air outlet opening adjacent the fuel jet, a valve stem and a valve turn-on handle therefor pivotally mounted on the valve, said handle being spaced from the torch handle and substantially parallel thereto whereby to effect turning on of the fuel supply.

2. A hand-operated portable weed burning torch having a torch handle having a length adapted to substantially fill the hand of an operator and a fuel supply extension pipe of a length at least four times the handle length and in axial alignment with the axis of the handle, a valve at the junction of the handle with the pipe and having a valve handle parallel to and lying in close proximity to the handle, a separate pilot supply pipe from the valve lying parallel and in close proximity to the extension pipe and having a pilot outlet at a location further from the handle than a free end of the extension pipe, a fuel jet orifice at said free end of the extension pipe, a barrel surrounding and spaced laterally from the jet orifice having an air inlet opening on the valve side of the orifice and a combined gas and air outlet on the other side of the orifice and directed toward the area around the pilot outlet, a housing around and spaced from the pilot outlet, said housing having perforations substantially in line with a stream of mixed air and gas from the outlet of said barrel, a pilot jet in said pilot supply pipe, said pilot supply pipe having an independent free air inlet adjacent said jet and on a side thereof remote from the valve.

3. A portable hand operated weed burning torch comprising a torch handle having a gas passage from one end of the handle to the other and a connection at one end for a supply of liquid petroleum gas, a supply of gas to said passage under a pressure in excess of about ten pounds per square inch, a valve in the gas passage and a valve actuating handle lying along said torch handle, a fuel supply extension pipe from the valve having an endwardly discharging fuel jet at its outermost end discharging into open air, a pilot line assembly from the valve at the supply side thereof comprising a pilot pipe having one end connected to the valve and subject to said pressure, a pilot extension portion extending outwardly beyond said fuel jet, an endwardly discharging pilot opening at the outlet end of said pilot extension portion, a generally cylindrical flame housing extending outwardly of said pilot opening and adjacent the extended axis of said fuel supply extension pipe, said flame housing being spaced endwardly clear of said fuel jet a distance enabling fuel gas to pass through the atmosphere for a distance in excess of about five inches before reaching a point of ignition adjacent said flame housing, said flame housing having a multiplicity of perforations therethrough out the length and circumference, and a pilot flame in said housing burning constantly during operation at a fixed preselected rate, a pilot jet in said pilot supply pipe adjacent the valve, an air intake in the pilot supply pipe on the downstream side of said pilot jet, the sizes of said pilot jet and said air intake having a predetermined set relationship, said fuel jet being adapted thereby to direct a laterally unrestrained stream of fuel gas through the atmosphere to and past the exterior of said flame housing whereby to project a mixed mass of pilot ignited fuel and air a distance outwardly of the flame housing comparable to the length of the torch.

4. A portable weed burning torch comprising a connection having a gas passage therein for a supply of liquid petroleum gas, a supply of gas to said connection at a pressure in excess of about ten pounds per square inch, a valve in the gas passage having on and off positions, a fuel supply extension pipe from the valve having an endwardly discharging fuel jet at its outermost end discharging into open air, a pilot line assembly from the valve at the supply side thereof comprising a pilot pipe having one end connected to the valve and subject to said pressure, a pilot extension portion extending outwardly beyond said fuel jet, an endwardly discharging pilot opening at the outlet end of said pilot extension portion, a generally cylindrical flame housing extending longitudinally outwardly of said pilot opening adjacent the extended axis of said fuel supply extension pipe, said flame housing being spaced endwardly clear of said fuel jet a distance enabling fuel gas to pass through the atmosphere for a distance in excess of about five inches before reaching a point of ignition adjacent said flame housing, said flame housing having a multiplicity of perforations therethrough throughout the length and circumference, and a pilot flame in said housing burning constantly during operation at a fixed preselected rate, a pilot jet in said pilot supply pipe adjacent the valve, an air intake in the pilot supply pipe on the downstream side of said pilot jet, the sizes of said pilot jet and said air intake having a predetermined set relationship, said fuel jet being adapted thereby to direct a laterally unrestrained stream of fuel gas through the atmosphere along the pilot supply pipe and around and past the exterior of said flame housing whereby to project a mixed mass of pilot ignited fuel and air a distance outwardly of the flame housing comparable to the length of the torch.

References Cited in the file of this patent

UNITED STATES PATENTS

| | | |
|---|---|---|
| 223,326 | Emerton | Jan. 6, 1880 |
| 1,033,967 | Van Horn | July 30, 1912 |
| 1,245,548 | Alexander | Nov. 6, 1917 |
| 2,094,854 | Smith | Oct. 5, 1935 |
| 2,417,981 | Graham | Mar. 25, 1947 |
| 2,601,893 | Funke | July 1, 1952 |

FOREIGN PATENTS

| | | |
|---|---|---|
| 482,627 | Germany | Aug. 29, 1929 |